United States Patent [19]
> Orthman

[11] 3,766,987
[45] Oct. 23, 1973

[54] PLANTER MARKER
[75] Inventor: Henry K. Orthman, Lexington, Nebr.
[73] Assignee: Orthman Manufacturing Inc., Lexington, Nebr.
[22] Filed: Jan. 24, 1972
[21] Appl. No.: 220,332

[52] U.S. Cl. ................................ 172/126, 172/739
[51] Int. Cl. .............................................. A01b 17/00
[58] Field of Search .......................... 172/126–132

[56] References Cited
UNITED STATES PATENTS

| | | | |
|---|---|---|---|
| 2,939,537 | 6/1960 | Reaves | 172/128 |
| 2,962,103 | 11/1960 | Hansen | 172/126 |
| 3,072,200 | 1/1963 | Yerkes | 172/126 |
| 3,161,164 | 12/1964 | Tanke | 172/126 X |
| 3,250,333 | 5/1966 | Day | 172/126 |
| 3,520,373 | 7/1970 | Stinemetz | 172/130 |
| 3,666,019 | 5/1972 | Yeske | 172/130 |
| 3,669,195 | 6/1972 | Green et al. | 172/126 X |

*Primary Examiner*—Robert E. Pulfrey
*Assistant Examiner*—Paul T. Sewell
*Attorney*—Zarley, McKee & Thomte

[57] ABSTRACT

A pair of frame members are interconnected at their opposite ends with the inner ends being connected to the frame of a planter and the outer ends having a pivotal marker arm. One of the frame members is straight while the other frame member includes two portions extending at an angle to the one frame member and interconnected at adjacent ends in spaced relation to the one frame member. A hydraulic cylinder is provided for raising and lowering the frame assembly and is connected to one of a plurality of cross plates in each frame assembly interconnecting elongated side elements. The marker arm includes telescopic portions, one of which is connected to the outer end of the pair of frame members and the other telescopic member extends inwardly beyond the pivotal connection for engagement with a cross element to limit the pivotal movement of the marker arm such that it is maintained substantially parallel to the elongated frame assembly when in its lowered operative position. An upstanding post is provided at the inner end of the frame assembly and includes a resilient bumper for engagement with a cross element on the frame assembly when it is pivoted to its upstanding raised position. A resilient stop is provided on the frame assembly for yieldably limiting pivotal action of the marker arm toward the frame assembly when the frame assembly is in its raised position. An upstanding arcuate element is provided on the marker arm and is connected to a chain extending to the upstanding post such that when the frame assembly is lowered the marker arm is extended and when the frame assembly is raised the marker arm is allowed to pivot downwardly against the yieldable stop element on the frame assembly. A depth-control band is provided on the disk element on the outer end of the marker arm.

1 Claim, 10 Drawing Figures

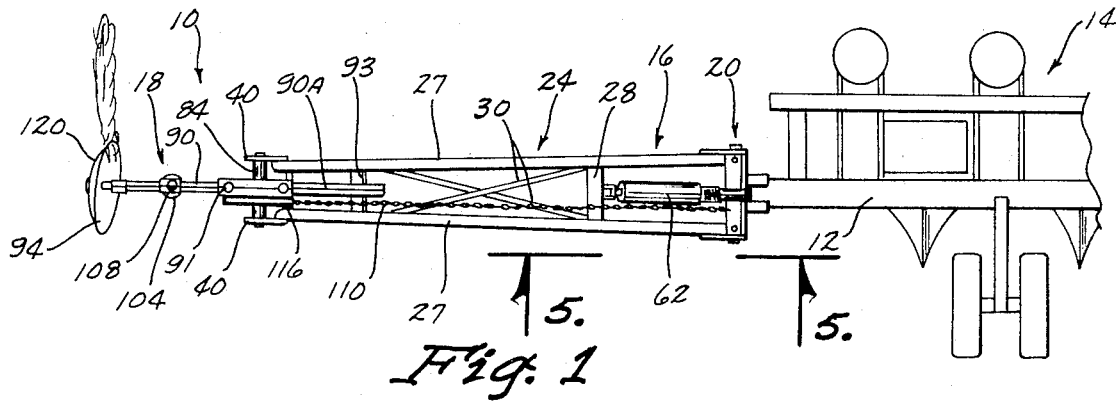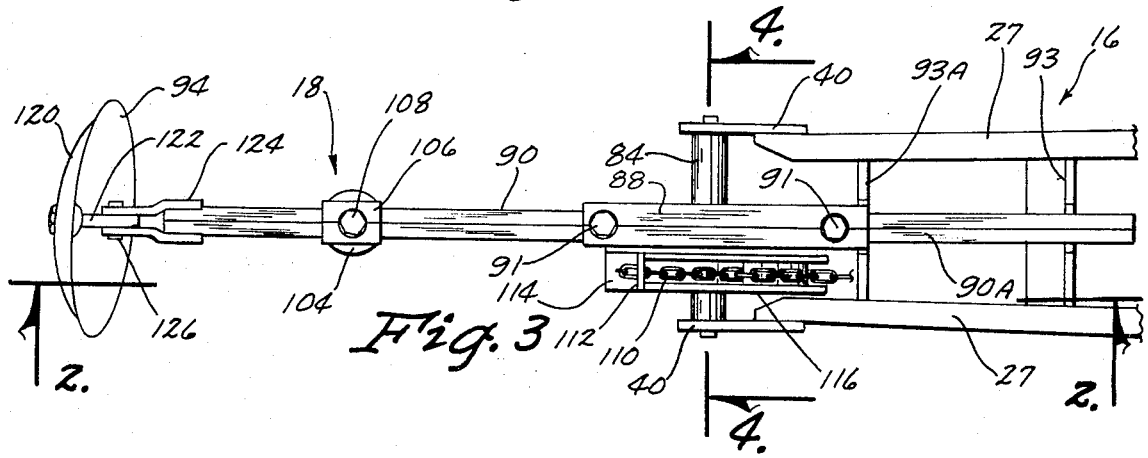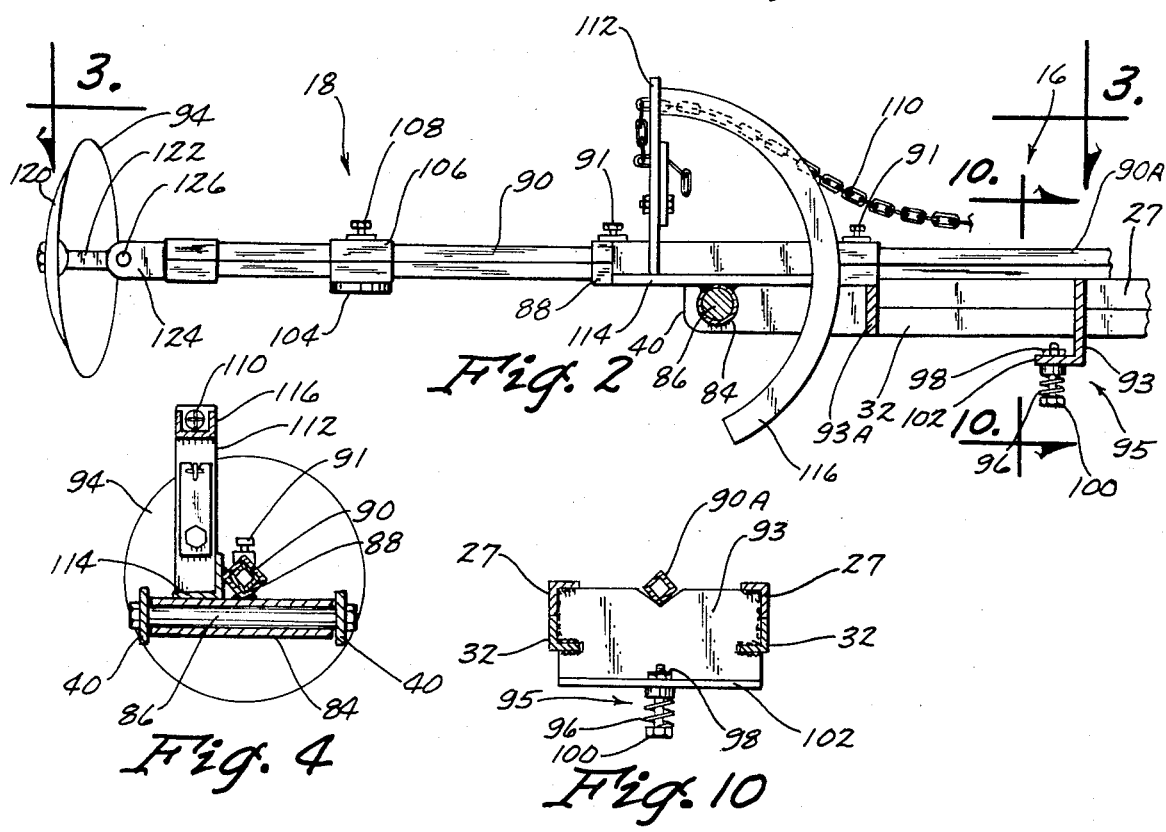

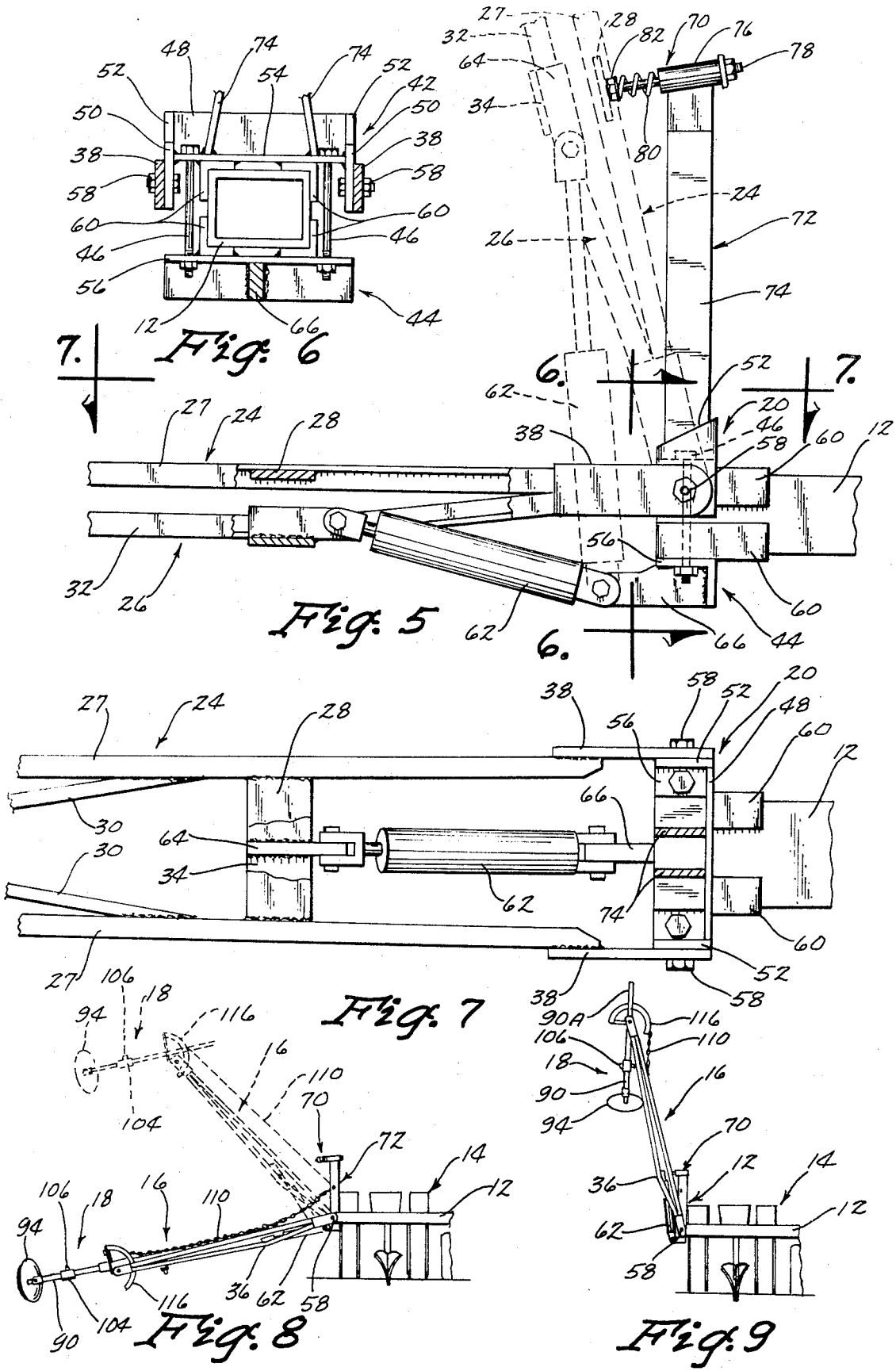

PLANTER MARKER

The planter marker of this invention is designed to give positive control over the arm through use of gravity and a hydraulic power cylinder which will maintain the disk blade marker in engagement with the ground regardless of its texture. A depth gauge band is provided on the blade to prevent the blade from cutting too deep. The frame assembly for the marker arm is made of a pair of frame members each having elongated side elements interconnected by a plurality of cross elements. The bottom frame member includes two portions connected to the adjacent opposite ends of the one frame member with their inner ends interconnected in spaced relation to the one frame member whereby the two portions extend at an acute angle to the one frame member. An upstanding member on the inner end of the frame assembly carries a resilient stop element for engagement with a cross element on the frame assembly when the frame assembly is in its raised position. The stop element will protect the hydraulic cylinder when it raises the frame assembly.

The marker arm includes telescopic portions one of which is connected to the outer end of the frame assembly through a sleeve to a cross pin on which the sleeve is rotatably mounted. The inner end of the other telescopic member extends inwardly along the frame member for engagement with one of the cross elements to maintain the marker arm substantially parallel to the frame assembly when it is lowered to its operative position. A V-shaped notch is cut in the cross element to limit bending of the marker arm. A resilient cushion is provided on the frame assembly in a position to be engaged by an adjustable element on the marker arm when the marker arm is in its pivoted position against the frame assembly when the frame assembly is in its raised inoperative position.

An arcuate member is provided on the marker arm to receive and guide a chain connected thereto and also connected to the upstanding member on the inner end of the frame assembly. The chain has an appropriate length such that it will automatically cause the marker arm to be extended when the frame assembly is lowered to its operative position and when the frame assembly is raised the chain will become loose allowing the marker arm to pivot by gravity downwardly into engagement with the yieldable stop element thereby reducing the overall length of the planter marker for transport purposes.

This invention consists in the construction, arrangements and combination of the various parts of the device, whereby the objects contemplated are attained as hereinafter more fully set forth, specifically pointed out in the claims, and illustrated in the accompanying drawings in which:

FIG. 1 is a fragmentary top plan view of the marker assembly mounted on the frame of a planter with the marker assembly fully extended and the marking disk blade in engagement with the ground.

FIG. 2 is a side elevation view thereof taken along line 2 — 2 in FIG. 3.

FIG. 3 is an enlarged fragmentary top plan view of the marker arm and its pivotal connection to the marker frame assembly.

FIG. 4 is a cross sectional view taken along line 4 — 4 in FIG. 3.

FIG. 5 is a fragmentary enlarged side elevation view of the frame assembly and the power cylinder for raising and lowering same against a resilient stop element.

FIG. 6 is a cross-sectional view taken along line 6 — 6 in FIG. 5.

FIG. 7 is a cross-sectional view taken along line 7 — 7 in FIG. 5.

FIG. 8 is a reduced in scale front elevation view showing the marker assembly in its operative and partially raised positions to illustrate the operation of the chain connecting the marker arm to the upstanding post on the inner end of the frame assembly.

FIG. 9 is a reduced in scale front elevation view showing the frame assembly fully raised with the marker arm pivoted downwardly against the resilient stop on the frame assembly; and FIG. 10 is a cross-sectional view taken along line 10 — 10 in FIG. 2.

The planter marker of this invention is referred to generally in FIG. 1 by reference numeral 10 and is shown mounted on the tool bar 12 of a planter 14.

The planter marker 10 includes a main frame assembly 16 having a marker arm 18 pivotally mounted on the outer end and a mounting bracket 20 on the inner end connecting it to the tool bar 12 of the planter 14.

The frame assembly 16 includes top and bottom frame members 24 and 26. Top frame member 24 is seen in FIGS. 5 and 7 to have elongated side angle elements 27 interconnected by a plurality of cross elements 28 and diagonally extending cross elements 30. The bottom frame member 26 also includes a pair of angle side elements 32 and as seen in FIGS. 5 and 8, they are bent inwardly of their center at 36 away from the frame member 24 and the opposite ends thereof extend to engagement with the inner and outer ends of frame member 24 where side plates 38 at the inner ends connect the adjacent ends of frame members 24 and 26 and side plates 40 at the outer ends connect the outer ends of the frame members 24 and 26. An exceptionally strong frame structure is provided by this arrangement.

The mounting bracket 20 is best shown in FIGS. 5, 6 and 7 and includes a top clamping bracket 42 rigidly connected to the side plates 38 and is connected to a bottom clamping bracket 44 by a pair of bolts 46. The top clamping bracket 42 includes a transversely extending angle iron 48 having vertically disposed end plates 50 and an outwardly facing beveled edge 52. The bolts 46 extend through the leg 54 of the angle iron 48 downwardly to engage the leg 56 of the angle iron bracket 44. Bolts 58 are seen to connect the side plates 38 to the vertically disposed plates 50. Four longitudinally extending angle elements 60 are welded to the legs 54 and 56 of the brackets 42 and 44 to embrace the tool bar 12.

A single-acting hydraulic cylinder 62 is connected to plate elements 64 and 66 in turn connected to the cross element 34 on the lower frame member 26 and the lower mounting bracket 44, respectively. It is seen that the frame assembly 16 is pivoted about the axis through the bolts 58 and the power cylinder 62 is pivotal about the connection to the plate 66 which is outwardly and downwardly offset therefrom to allow at least 90° of pivotal movement.

Protection is afforded the frame assembly 16 and the hydraulic cylinder 62 by a resilient stop assembly 70 mounted on the upper end of an upstanding post 72 comprised of divergently extending legs 74 connected to the angle iron leg 54 of the top mounting bracket 42.

The stop element includes a sleeve 76 through which a bolt 78 extends having a spring 80 thereon adapted to be compressed between the sleeve 76 and a nut 82 upon the nut on the outer end of the bolt engaging the cross element 28 on the upper frame 24 when the frame assembly 16 is raised to its upstanding position indicated by the dash lines in FIG. 5.

The outer end of the frame assembly 16 including the side plates 40 is seen in FIG. 3 to have a sleeve 84 on a shaft 86 welded to a square in cross section tube 88 whereby the marker arm 18 having a telescoping tube 90 received in the tube 88 will be permitted to pivot between the extended and lowered positions of FIG. 8 and FIG. 9. The telescopic tube section 90 may be selectively extended or retracted within the tube 88 and locked in place by the set screws 91. A portion 90A of the telescopic tube 90 extends inwardly of the pivotal sleeve 84 and is in engagement with a pair of cross elements 93 when the marker arm is fully extended to limit further pivotal action such that the depth of the disk blade marker 94 is controlled by the angle of the frame assembly 16 relative to the ground as seen in FIG. 8.

When the marker assembly is raised for transport purposes, as seen in FIG. 9, the marker arm 18 swings freely by gravity towards the frame assembly 16 and is resiliently stopped by a stop 95 on the cross element plate 93. The stop 95 is seen to include a spring 96 on a bolt 98 wherein the spring is held between a head 100 on the bolt 98 and the leg 102 of the angle plate element 93 such that the head 100 is adapted to engage a stop plate 104 on a slidably adjustable sleeve 106 on the telescopic element 90. A set screw 108 will lock the slide element 106 in place.

The raising and lowering of the marker arm 18 is accomplished by a chain 110 extending from an upstanding plate element 112 on an angle plate 114 rigidly carried on the sleeve 84 and having a lower end adapted to engage the cross element stop plate 93A. A channel-shaped chain guide track 116 is connected at one end to the upper end of the upstanding plate 112 and is disposed substantially perpendicularly to the frame assembly 16 such that a rounded track surface is presented to the chain 110 throughout all pivotal movement of the marker arm 18, as best seen in FIGS. 8 and 9. The inner end of the chain 110 is anchored to the upstanding post 72 above the pivotal axis of the frame assembly 16 through the bolts 58 whereby when the frame assembly is raised the marker arm may freely pivot downwardly and when the frame assembly is lowered the chain will pull the marker arm outwardly whereupon further movement of the frame assembly 16 will cause the ground to force the marker arm 18 to its fully pivoted position of FIG. 8 and the chain 110 at that time will be slightly loose.

It is seen that the marker arm 18 is designed to provide maximum strength to resist downward pressures of the frame assembly and the hydraulic cylinder by the square in cross section tube 90 being arranged with diagonally opposite corners being in vertical and horizontal planes as seen in FIG. 4. The largest forces applied to the marker arm 18 are in horizontal and vertical planes. The forward movement of the implement while the disk blade 94 is in the ground tends to pull the marker arm 18 rearwardly.

The disk blade 94 includes a depth control band 120 which will prevent the blade from burying itself in porous soil. The blade 94 is mounted on a flat bar 122 clamped between a pair of plates 124 welded to the outer end of the telescopic element 90. Only a single bolt 126 is required as the outer ends of the plates 124 are bent outwardly prior to being clamped against the sides of the flat bar shaft 122 whereby uniform pressure is applied along the full length of the bar shaft being clamped. Upon removal of the bolt 126 the plate ends 124 will spring outwardly.

Thus it is seen that a marker arm has been provided that will be usable on the largest planter equipment presently being used. The unique design of the two frame members 24 and 26 gives maximum strength to the frame 16. It is further noted that the frame assembly 16 tapers from the mounting bracket 20 outwardly to the marker arm 18, as best seen in FIG. 1, thereby providing maximum strength at the base for the mounting bracket 20. It is further seen that the mounting bracket 20 may be easily removed from the side plates 38 connected to the frame assembly 16 and thereby allowing an appropriate mounting bracket 20 to be positioned in its place for mounting the marker on a tool bar 12 of a different size. The mounting bracket 20 will have the angle plate 60 positioned to matingly receive the tool bar 12.

The resilient stop elements 70 and 95 will assure a smooth operation of the marker assembly when it is raised to its transport position of FIG. 9.

I claim:

1. A planter marker comprising, an elongated frame assembly having a pair of frame members interconnected at their inner and outer ends with said inner ends being adapted to be pivotally connected to the frame of a planter and the outer ends including a pivotal marker arm, one of said pair of frame members being straight along its substantial length and said other frame member having two portions with their outer ends connected to the opposite ends of said one frame member and said two portions extending at an angle to said one frame member and interconnected at their inner ends in lateral spaced relation to the inner end of said one frame member, each of said pair of frame members including spaced apart elongated side elements interconnected by a plurality of cross elements, a downwardly extending planter mounting bracket being provided on the inner ends of said pair of frame members and a hydraulic power cylinder being connected to the other of said frame members at one end thereof and the other end being connected to said mounting bracket remotely of said pair of frame members to provide for a lever arm for pivotal movement of said frame assembly, an upstanding post being provided on said mounting bracket and including a yieldable bumper in the path of said frame assembly when pivoted to an up position thereby limiting the up travel of said frame assembly, said pivotal marker arm being connected to the outer end of said pivotal pair of frame members at a point intermediate the ends thereof and one of said cross elements being positioned in the path of pivotal movement of said inner end of said marker arm to maintain said marker arm substantially parallel to said frame assembly when said frame assembly is in an operative lowered position, said marker arm including a pair of telescopic members and one of said telescopic members being secured to the outer end of said pair of frames and the other telescopic member may be telescopically movable relative to said one telescopic member, a yieldable cushion element being provided between said pair of frame members and said marker arm in the path of said market arm as it pivots towards said pair of frame members when said pair of frame members is in a vertical raised position, said marker arm including a 180° arcuate guide member and said marker arm bisects radially said guide member, a chain extends from the upper end of said guide member to said upstanding post above the pivotal connection of said pair of frame members to said planter frame and the length of said chain is such that upon said pair of frame members pivoting to said lowered operative position said chain becomes taut and said marker arm is pivoted up to a position substantially parallel with said pair of frame members and when said pair of frame members is raised said chain becomes loose allowing said marker arm to pivot towards said pair of frame members.

* * * * *